Oct. 4, 1949.　　　W. L. HANSEN ET AL　　　2,483,539
SYNCHRONOUS MOTOR
Filed May 20, 1948
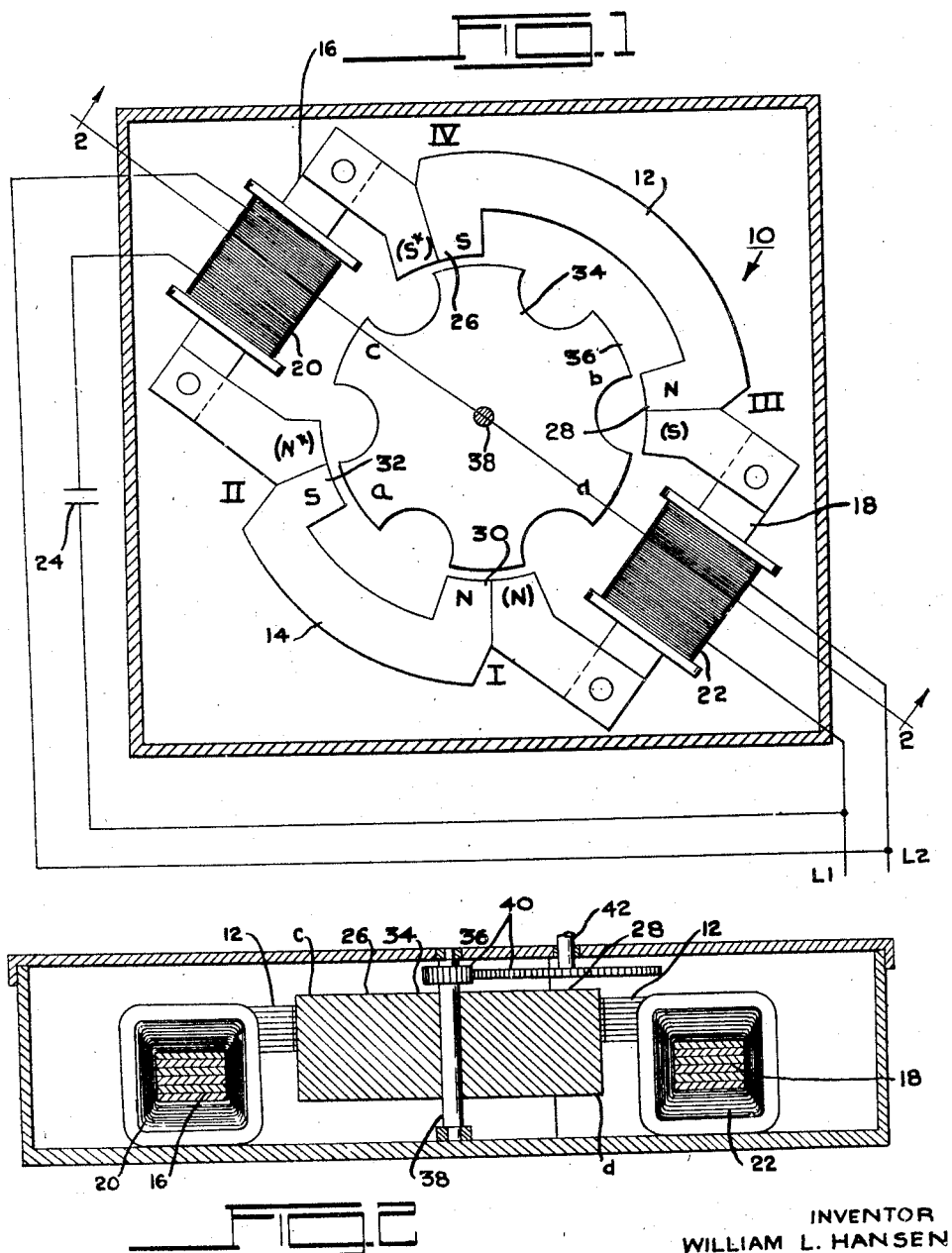
INVENTOR
WILLIAM L. HANSEN &
JAMES M. HUSH
BY
Toulmin & Toulmin
ATTORNEYS Patented Oct. 4, 1949

2,483,539

UNITED STATES PATENT OFFICE 2,483,539

SYNCHRONOUS MOTOR

William L. Hansen, Princeton, Ind., and James M. Hush, Dayton, Ohio, assignors to Hansen Manufacturing Company, Princeton, Ind., a corporation of Indiana Application May 20, 1948, Serial No. 28,228

5 Claims. (Cl. 172—278)

1

This invention relates to electric motors, and particularly to small synchronous electric motors especially adapted for driving clocks, timers, and the like.

One of the primary objects of this invention is to provide a new type of construction for small synchronous electric motors which results in a relatively inexpensive structure and one which is easy to manufacture and assemble.

It is also an object of this invention to provide a novel means of transforming electrical power into mechanical power, such that commercial electric power at a frequency of from 50 to 60 cycles per second can readily be converted into relatively slow speed mechanical power.

Another object of this invention is to construct a small synchronous electric motor utilizing a combination of permanent magnets and electro-magnets such that the portion of the field of the motor which transmits power to the armature or rotor thereof is pulsating rather than alternating and whereby the said rotor operates at low speed.

These and other objects and advantages will become more apparent upon reference to the following description taken in connection with the accompanying drawings in which:

Figure 1 is a plan view of a motor constructed according to this invention; and

Figure 2 is a vertical section through the motor and as indicated by the line 2—2 on Figure 1.

Referring to the drawings, the motor of this invention comprises a field structure generally indicated at 10 and which consists of the alternately arranged permanent magnets 12 and 14 which have their adjacent ends interconnected by the laminated and soft iron magnetic parts 16 and 18. Coils 20 and 22 are wound on the parts 16 and 18, respectively, and these coils are connected with the power lines L1 and L2 and with a phase shifting means such as the condenser 24 in series with one of the said coils.

As will be seen by the letters on the ends of the several parts of the field structure in Figure 1, the permanent magnets 12 and 14 are arranged in respective opposite directions. That is, in connection with the permanent magnet 12 the direction from the south pole to the north pole is clockwise, while in connection with the permanent magnet 14 the direction from the south pole to the north pole is counter-clockwise.

The coils 20 and 22 are similarly arranged on their respective magnetic parts 16 and 18 so that the magnetomotive forces developed thereby would normally be in respective opposite directions. However, due to the phase shifting means in the form of the condenser 24 in series with the coil 20, the current in this coil leads the coil 22 by substantially 90 degrees. Accordingly, the magnetomotive force acting in the magnetic part 16 leads that in the part 18 by substantially 90 degrees.

As will be seen in Figure 1, the joining ends of the permanent magnets 12 and 14 and the soft iron magnet parts 16 and 18 are formed inwardly to define the several field poles indicated at 26, 28, 30 and 32. It will be noted that these poles are asymmetrically located and the reasons for this will become apparent hereinafter.

The aforementioned field poles generally define a circular bore within which is rotatably mounted an armature 34 having a plurality of evenly spaced peripheral poles 36 which are adapted for registration with the said field poles. Due to the symmetrical arrangement of the poles 36 of the rotor and the asymmetrical arrangement of the poles of the field structure, different rotor poles will successively align with different field poles during rotation of the rotor in one direction. For example, the rotor 34 rotates clockwise and as shown the lowermost pole thereof is in alignment with the field pole marked I. As the rotor continues its clockwise rotation, the pole thereof marked $a$ will move into alignment with the field pole marked II. Thereafter the rotor pole marked $b$ will move into alignment with the field pole marked III. Further clockwise rotation of the rotor will bring the pole marked $c$ thereof into alignment with the field pole marked IV and, finally, further rotation of the rotor in the same direction will bring the pole marked $d$ into alignment with the field pole marked I and the entire cycle will recommence.

It will be understood that any suitable means could be provided for connecting the rotor 34 with the load to be driven, such as the supporting shaft 38 and the gearing 40 which connects the said shaft with the output shaft 42.

It will readily be seen that the particular gear ratio existing between the shafts 38 and 42 could be varied at will, depending upon the particular use to which the motor was to be put, and that the arrangement shown is merely exemplary of the many driving devices that could be employed.

The operation of the motor of this invention may be described as follows:

When the coil 22 is actuated as shown in the diagram, field pole I is emitting a maximum number of lines of force of north polarity, and field pole III is emitting no lines of force. At the same time, the alternating current coil 20 has practically no current flowing through it because of the fact that its current is advanced in phase, upwards of 90 degrees over that of the coil 22. Therefore, field pole II is emitting a few magnetic lines of force of polarity south, and the same is true of field pole IV. Therefore, the lines of force emitting from field pole I complete their magnetic circuit through field poles III and IV. Therefore, without a load on the armature, the armature will assume the position shown in the diagram relative to its poles at the instant under consideration, due to the attraction at field pole I. Ninety electrical degrees later pole II will emit a maximum number of magnetic lines of force of south polarity, poles III and I will emit a small number of lines of force, and pole IV will emit no lines of force. Therefore, the armature will advance half a pole width so as to bring pole $a$ in juxtaposition with field pole II. Ninety degrees later the armature will advance another half pole width so as to bring pole $b$ in juxtaposition with field pole III, and ninety degrees later the same will be true of pole $c$ and pole IV, the process thereafter repeating in the above same sequence. Therefore, the field pole structure constitutes a unidirectional rotating magnetic field, which will allow the armature to be self-starting, unidirectional, and to have ability to deliver power.

For the purposes of facilitating the reading of the drawings, the poles of the permanent magnets 12 and 14 in Figure 1 are marked N and S, respectively, for indicating the permanent north and south poles thereof. The poles of the electro-magnetic parts 16 and 18 are similarly marked N and S, but in parenthesis, to indicate that this is an instantaneous value, while the poles for the coil 20 are marked N* and S* to indicate that this polarity is substantially ninety degrees in advance of the polarity of the electro-magnet associated with the coil 22.

While the motor of this invention has been shown so arranged that only one field pole at a time is active in attracting the armature, it will be evident that it could be so constructed that the two oppositely arranged field poles could be active in any one instant and thereby prevent unbalanced radial thrusts on the armature which might tend to cause noisy operation of the motor or undue loading of the bearings supporting the rotor.

It will further be evident that the exact number of poles in the field structure or on the rotor could be varied to provide for different basic speeds of operation if desired, although, in general, the obtaining of different speeds of operation could be taken care of in the gearing 40.

It will be understood that this invention is susceptible to modification in order to adapt it to different usages and conditions, accordingly, it is desired to comprehend such modifications within this invention as may fall within the scope of the appended claims.

We claim:

1. In an electric motor; a field comprising alternate permanent magnets and electro-magnets arranged end to end to form a ring, field poles extending from the junction points of said magnets, a rotor having peripheral poles movable adjacent said field poles, said field and rotor poles being arranged so that different of said rotor poles successively align with different of said field poles as said rotor rotates in one direction, means including coils for exciting said electro-magnets with alternating magnetomotive forces, and means for obtaining a predetermined phase angle between the currents in the coils of said electro-magnets.

2. In a synchronous electric motor; a field structure comprising a pair of permanent magnets and a pair of electro-magnets extending between the ends of said permanent magnets to form a ring, said permanent magnets being arranged in said ring in respective opposite directions, coils on said electro-magnets, and phase shifting means associated with one of said coils, field poles extending inwardly from the junction points of said magnets, and a multi-pole rotor rotatably mounted between said field poles.

3. In a self-starting synchronous electric motor; a field structure comprising a pair of permanent magnets and a pair of electro-magnets arranged between the ends of said permanent magnets to form a closed magnetic path, said permanent magnets being arranged in said path in respective opposite directions, coils on said electro-magnets, and phase shifting means associated with one of said coils, pole faces formed at the junction points of said magnets and electro-magnets, and a multi-pole rotor rotatably mounted so that the poles thereof run in close proximity to the pole faces of said field structure.

4. In an electric motor; a field comprising alternate permanent magnets and electro-magnets arranged end to end to form a ring, field poles extending from the junction points of said magnets, a rotor having peripheral poles movable adjacent said field poles, said field and rotor poles being arranged so that different of said rotor poles successively align with different of said field poles as said rotor rotates in one direction, a single coil on each said electro-magnet wound thereabout between the points of abutment thereof with said permanent magnets for exciting said electro-magnets with alternating magnetomotive forces, and means for obtaining a predetermined phase angle between the currents in the coils of said electro-magnets.

5. In a synchronous electric motor; a field structure comprising a pair of permanent magnets and a pair of electro-magnets extending between the ends of said permanent magnets to form a ring, said permanent magnets being arranged in said ring in respective opposite directions, a single coil on each said electro-magnet wound thereabout between its points of abutment with said permanent magnets, and phase shifting means associated with one of said coils, field poles extending inwardly from the junction points of said magnets, and a multi-pole rotor rotatably mounted between said field poles, said field poles each being formed in part by one end of one of said electro-magnets and in part by one end of one of said permanent magnets.

WILLIAM L. HANSEN.
JAMES M. HUSH.

REFERENCES CITED

The following references are of record in the file of this patent:

UNITED STATES PATENTS

| Number | Name | Date |
|---|---|---|
| 1,952,498 | Hansen | Mar. 27, 1934 |
| 2,105,513 | Welch | Jan. 18, 1938 |